(12) United States Patent
Fluck et al.

(10) Patent No.: US 7,724,954 B2
(45) Date of Patent: May 25, 2010

(54) METHOD AND SYSTEM FOR INTERACTIVE IMAGE SEGMENTATION

(75) Inventors: Oliver Fluck, Plainsboro, NJ (US); Shmuel Aharon, West Windsor, NJ (US); Mikael Rousson, Trenton, NJ (US); Daniel Cremers, Bonn (DE)

(73) Assignee: Siemens Medical Solutions USA, Inc., Malvern, PA (US)

( * ) Notice: Subject to any disclaimer, the term of this patent is extended or adjusted under 35 U.S.C. 154(b) by 784 days.

(21) Appl. No.: 11/591,767

(22) Filed: Nov. 2, 2006

(65) Prior Publication Data

US 2007/0211940 A1 Sep. 13, 2007

Related U.S. Application Data

(60) Provisional application No. 60/736,450, filed on Nov. 14, 2005.

(51) Int. Cl.
*G06K 9/34* (2006.01)

(52) U.S. Cl. ............... 382/173; 382/171; 382/128; 382/131

(58) Field of Classification Search ........... 382/171, 382/173, 100, 110, 128, 131; 702/19; 378/57, 378/4, 901, 15, 901.15, 57.4; 73/433, 32 R; 250/363.04; 345/424
See application file for complete search history.

(56) References Cited

U.S. PATENT DOCUMENTS 6,317,509 B1 * 11/2001 Simanovsky et al. ........ 382/131

* cited by examiner

*Primary Examiner*—Anh Hong Do
(74) *Attorney, Agent, or Firm*—Donald B. Paschburg

(57) ABSTRACT

A method for segmentation of an image interactively with a user utilizes level set segmentation and includes selecting by user input respective areas of object and of background; initializing an embedding function implementing a segmentation boundary according to the selecting; computing intensity distributions and for the respective areas of object and of background; and performing repeatedly the steps below until convergence is reached: (a) evolving the embedding function, (b) recomputing the intensity distributions, and (c) checking for new user input and, if so: (d) updating labeling of the areas of object and background.

37 Claims, 4 Drawing Sheets (A)  (B)

(A)  (B)

(A)

(B)

(C)

(D)

(A)            (B)

METHOD AND SYSTEM FOR INTERACTIVE IMAGE SEGMENTATION

CROSS-REFERENCE TO RELATED APPLICATION AND CLAIM OF PRIORITY

Specific reference is hereby made to copending U.S. Provisional Patent Application No. 60/736,450 filed Nov. 14, 2005, in the names of inventors OLIVER FLUCK, SHMUEL AHARON, MIKAEL ROUSSON, and DANIEL CREMERS, and entitled A Probabilistic Formulation of User Interaction for Level Set Based Segmentation of 2D and 3D Images, and whereof the disclosure is hereby incorporated herein by reference and whereof the benefit of priority is claimed.

FIELD OF THE INVENTION

The present invention relates to electronic imaging and image processing and, more particularly, to interactive image segmentation.

BACKGROUND OF THE INVENTION

Level set methods have become increasingly popular as a framework for image segmentation.

The level set method was introduced by Osher and Sethian as a means to implicitly propagate hypersurfaces C(t) in a domain $\Omega \subset R^n$ by evolving an appropriate embedding function or level set function $\phi: \Omega \times [0,T] \to R$, where:

$$C(t) = \{x \in \Omega | \phi(x,t) = 0\}. \quad (1)$$

See S. J. Osher and J. A. Sethian: Fronts propagation with curvature dependent speed: Algorithms based on Hamilton-Jacobi formulations: J. of Comp. Phys., 79: 12-49, 1988.

The ordinary differential equation propagating explicit boundary points is replaced by a partial differential equation modeling the evolution of a higher-dimensional embedding function.1 Advantages of this approach are well-known: firstly, the implicit boundary representation does not depend on a specific parameterization, and no control point regriding mechanisms need to be introduced during the propagation. Secondly, evolving the embedding function allows topological changes to be modeled elegantly, such as splitting and merging of the embedded boundary. Thirdly, the implicit representation (1) naturally generalizes to hypersurfaces in three or more dimensions. To impose a unique correspondence between a contour and its embedding function one can constrain $\phi$ to be a signed distance function, i.e. $|\nabla \phi|=1$ almost everywhere.

A precursor of the level set method was proposed by Dervieux and Thomasset. See A. Dervieux and F. Thomasset: A finite element method for the simulation of Raleigh-Taylor instability: Springer Lect. Notes in Math., 771:145-158, 1979.

Early applications of the level set method to image segmentation were disclosed by Malladi et al., by Caselles et al., by Kichenassamy et al., and by Paragios and Deriche. See R. Malladi, J. A. Sethian, and B. C. Vemuri: A topology independent shape modeling scheme: In SPIE Conf. on GeometricMethods in Comp. Vision II, volume 2031, pages 246-258, 1994; V. Caselles, R. Kimmel, and G. Sapiro: Geodesic active contours: In Proc. IEEE Intl. Conf. on Comp. Vis., pages 694-699, Boston, USA, 1995; S. Kichenassamy, A. Kumar, P. J. Olver, A. Tannenbaum and A. J. Yezzi: Gradient flows and geometric active contour models: In IEEE Intl. Conf. on Comp. Vis., pages 810-815, 1995; and N. Paragios and R. Deriche: Geodesic active regions and level set methods for supervised texture segmentation: Int. J. of Computer Vision, 46(3):223-247, 2002 Level set implementations of the Mumford-Shah functional were independently proposed by Chan and Vese; and by Tsai et al. See D. Mumford and J. Shah: Optimal approximations by piecewise smooth functions and associated variational problems: Comm. Pure Appl. Math., 42:577-685, 1989; T. Chan and L. Vese: Active contours without edges: IEEE Trans. Image Processing, 10(2):266-277, 2001; and A. Tsai, A. Yezzi, W. Wells, C. Tempany, D. Tucker, A. Fan, E. Grimson, and A. Willsky: Model-based curve evolution technique for image segmentation: In Comp. Vision Patt. Recog., pages 463-468, Kauai, Hi., 2001.

In contrast to other competitive segmentation methods such as graph cut approaches (see Boykov et al. and Shi et al. below), or the RandomWalker (see Grady et al. below), the level set method is based on a precise notion of a shape given by the representation in (1). See Y. Boykov, O. Veksler, and R. Zabih: Fast approximate energy minimization via graph cuts: IEEE T. on Patt. Anal. and Mach. Intell., 23(11):1222-1239, 2001; J. Shi and J. Malik: Normalized cuts and image segmentation: In Proc. IEEE Conf. on Comp. Vision Patt. Recog. (CVPR'97), San Juan, Puerto Rico, 1997; and L. Grady and G. Funka-Lea: Multi-label image segmentation for medical applications based on graph-theoretic electrical potentials: In M. Sonka, I. A. Kakadiaris, and J. Kybic, editors, Computer Vision and Mathematical Methods in Medical and Biomedical Image Analysis, number 3117 in LNCS, pages 230-245, Springer, 2004.

As a consequence, it is amenable to the introduction of statistical shape information which has been shown to drastically improve the segmentation of familiar objects in a given image. See M. Leventon, W. Grimson, and O. Faugeras: Statistical shape influence in geodesic active contours: In CVPR, volume 1, pages 316-323, Hilton Head Island, S.C., 2000; A. Tsai, A. J. Yezzi, and A. S. Willsky: Curve evolution implementation of the Mumford-Shah functional for image segmentation, denoising, interpolation, and magnification: IEEE Trans. on Image Processing, 10(8): 1169-1186, 2001; Y. Chen, H. Tagare, S. Thiruvenkadam, F. Huang, D. Wilson, K. S. Gopinath, R. W. Briggs, and E. Geiser: Using shape priors in geometric active contours in a variational framework: Int. J. of Computer Vision, 50(3):315-328, 2002; D. Cremers, S. J. Osher, and S. Soatto: Kernel density estimation and intrinsic alignment for knowledge-driven segmentation: Teaching level sets to walk: In C. E. Rasmussen, editor, Pattern Recognition, volume 3175 of LNCS, pages36-44. Springer, 2004; T. Riklin-Raviv, N. Kiryati, and N. Sochen: Unlevel sets: Geometry and prior-based segmentation: In T. Pajdla and V. Hlavac, editors, European Conf. on Comp. Vision, volume 3024 of LNCS, pages 50-61, Prague, 2004. Springer; D. Cremers, N. Sochen, and C. Schnorr: A multiphase dynamic labeling model for variational recognition-driven image segmentation: Int. J. of Computer Vision, 2005, To appear; and M. Rousson and D. Cremers: Efficient kernel density estimation of shape and intensity priors for level set segmentation: In MICCAI, volume 2, pages 757-764, 2005.

Various aspects relating to the background and field of the present invention are treated in a number of text-books, in addition to the publications mentioned herein in the course of the description of the present invention. For example, reference is made to the following text-books for useful background material: DIGITAL IMAGE PROCESSING, by Gonzalez and Woods, published by Prentice-Hall Inc., New Jersey, 2002; LEVEL SET METHODS AND FAST MARCHING METHODS, by J. A. Sethian, published by Cambridge University Press, 1996; 1999; IMAGE PRO- CESSING, ANALYSIS, AND MACHINE VISION, by Sonka, Hlavac, and Boyle, published by Brooks/Cole Publishing Company, Pacific Grove, Calif., 1999; and FUNDAMENTALS OF ELECTRONIC IMAGE PROCESSING, by A. R. Weeks, Jr., IEEE Press, New York, 1996; and various other text-books.

BRIEF SUMMARY OF THE INVENTION

It is herein recognized that existing level set methods are inferior in certain respects to alternative approaches when used as an interactive segmentation tool. When the system is provided an initial boundary, the underlying energy minimization propagates these boundaries to the final segmentation. If this segmentation is not the desired one, the user typically cannot interactively modify the outcome. It is herein further recognized that, when they are used as a generic segmentation tool, level set methods generally exhibit an important drawback in that current formulations do not allow much user interaction. Upon initialization, boundaries typically propagate to the final segmentation without the user being able to guide or correct the segmentation in process.

However, such user interaction is highly desirable in many areas of image segmentation. In the field of medical image analysis, for example, the correction by a human expert of a level set based segmentation requires a tedious post-processing step. In contrast to the methods in Boykov et al., and Grady et al., both cited above, it is not possible for the user to specify areas which are known to be part of the object or of the background.

At the same time, user interaction in image segmentation is typically incorporated on the basis of a simple rule-based reasoning, namely: if a point is marked as object, then it is object, if it is marked as background, then it is background.

An object of the present invention is to overcome this limitation by utilizing a probabilistic framework for image segmentation which integrates input intensity information and user interaction on equal footings. The resulting algorithm in accordance with the present invention determines the most likely segmentation given the input image and the user input. In order to allow a user interaction in real-time during the segmentation, the algorithm is implemented on a graphics card and in a narrowband formulation.

In accordance with an aspect of the invention, a method for segmentation of an image interactively with a user utilizes level set segmentation and includes selecting by user input respective areas of object and of background; initializing an embedding function $\phi$ implementing a segmentation boundary according to the selecting; computing intensity distributions $p_1$ and $p_2$ for the respective areas of object and of background; and performing repeatedly the steps below until convergence is reached: (a) evolving the embedding function $\phi$, (b) recomputing the distributions $p_1$ and $p_2$, and (c) checking for new user input and, if so: (d) updating labeling of the areas of object and background.

In accordance with another aspect of the invention, a method for interactive level set image segmentation, comprises: selecting and labeling by user input respective image areas of object and of background; initializing an embedding function $\phi$ for implementing a segmenting boundary in accordance with the user input; computing intensity distributions $p_1$ and $p_2$ by performing a kernel density estimate of intensity distributions associated with the respective areas of object and of background; and performing repeatedly steps (a), (b), (c) and (d) below until convergence is reached: (a) evolving the embedding function $\phi$ in accordance with an evolution equation, (b) recomputing the distributions p1 and p2, and (c) if a new user input is found, updating labeling of the areas of object and background and returning to step (a) and, if no new user input is found, then ending.

In accordance with another aspect of the invention, the step of evolving comprises utilizing a narrow band formulation.

In accordance with another aspect of the invention comprises: implementing the narrow band formulation on a graphics card.

In accordance with another aspect of the invention, the step of evolving comprises evolving for minimizing the total energy associated with each of data, user input, and shape.

In accordance with another aspect of the invention, the step of evolving comprises evolving the following descent equation:

$$\frac{\partial \phi}{\partial t} = \delta(\phi)\left(v_1 div\left(\frac{\nabla \phi}{|\nabla \phi|}\right) + (e_2 - e_1) + v_2 L_\sigma\right);$$

wherein
$v_1$ and $v_2$ are parameters for providing an overall weight of the user input to determine how strongly the user input will affect segmentation,
$e_i = -\log p_i$ represents an energy density,
$L_\sigma$ is a Gaussian smoothed label function given by
$L_\sigma(y) = \int L(x) k_\sigma(x, y) dx$, where "brush size" $\sigma$ defines a spatial range within which a point labeled as object or as background will affect segmentation, and
$k_\sigma$ is the Gaussian kernel function.

In accordance with another aspect of the invention, a method for interactive level set image segmentation, comprises: selecting and labeling by user input respective image areas of object and of background; initializing an embedding function $\phi$ for implementing segmenting boundary in accordance with the user input; computing intensity distributions $p_1$ and $p_2$ by performing a kernel density estimate of intensity distributions associated with the respective areas of object and of background; evolving the embedding function $\phi$ in accordance with an evolution equation; and recomputing the distributions $p_1$ and $p_2$.

In accordance with another aspect of the invention, a method for image segmentation interactively with a user, comprises: utilizing a level set method for segmentation, including an embedding function $\phi$; selecting and labeling by user input respective areas of object and of background; initializing the embedding function $\phi$ implementing a segmenting boundary according to the selecting; computing intensity distributions $p_1$ and $p_2$ by performing a kernel density estimate of intensity distributions associated with the respective areas of object and of background; and performing repeatedly steps (a), (b), (c) and (d) below until convergence is reached: (a) evolving the embedding function $\phi$ as a function of the distributions $p_1$ and $p_2$, a Gaussian smoothed label function, and an overall weight accorded the user input, (b) recomputing the distributions p1 and p2, and (c) checking for new user input and, if so: (d) updating labeling of the areas of object and background.

In accordance with another aspect of the invention, a method for image segmentation comprises: implementing foregoing steps on a graphics card.

In accordance with another aspect of the invention, a method for image segmentation comprises: implementing foregoing steps on a graphics card in a narrow band formulation.

In accordance with another aspect of the invention, a method for image segmentation comprises: defining convergence as a point when changes cease in the boundary.

In accordance with another aspect of the invention, the step of evolving the embedding function φ comprises evolving a descent equation wherein: a first term operates to minimize the length of the boundary, a second term drives the boundary to separate the intensity distributions, and a third term controls the segmentation such that the segmentation tends to favor segmentation of the areas of object and background in compliance with the user input.

In accordance with another aspect of the invention, a method for image segmentation, comprising, in the event of multiple selections of a given area by the user input: treating such selections as independent events for providing a single label function corresponding to the number of positive selections minus the number of negative selections.

In accordance with another aspect of the invention, a method for image segmentation, comprising, in the event of multiple selections of a given area by the user input: treating repeated selections of the same sign as strengthening the effect of such selections.

In accordance with another aspect of the invention, a method for image segmentation interactively with a user, comprises: labeling by user input respective areas of object and of background; initializing an embedding function φ implementing a segmenting boundary according to the labeling; computing intensity distributions $p_1$ and $p_2$ for the respective areas of object and of background; and performing repeatedly steps (a), (b), (c) and (d) below until convergence is reached: (a) evolving the embedding function φ as a function of: the distributions $p_1$ and $p_2$, a Gaussian smoothed label function, and an overall weight accorded the user input, by minimizing a total energy being the sum of: (A) energy associated with the length of the segmenting boundary, (B) energy associated with the segmenting boundary in separating the respective areas, and (C) energy associated with the user input; (b) recomputing the distributions $p_1$ and $p_2$, and (c) checking for new user input and, if so, (d) updating labeling of the areas of object and background.

In accordance with another aspect of the invention, a system for imaging for interactive level set image segmentation, comprises: a memory for storing a program and other data; and a processor in communication with the memory device, the processor being operative with the program to perform: selecting and labeling by user input respective image areas of object and of background; initializing an embedding function φ for implementing a segmenting boundary in accordance with the user input; computing intensity distributions $p_1$ and $p_2$ by performing a kernel density estimate of intensity distributions associated with the respective areas of object and of background; and performing repeatedly steps (a), (b), (c) and (d) below until convergence is reached: (a) evolving the embedding function φ in accordance with an evolution equation, (b) recomputing the distributions p1 and p2, and (c) if a new user input is found, updating labeling of the areas of object and background and returning to step (a) and, if no new user input is found, then ending.

In accordance with another aspect of the invention, a computer program product comprises a computer useable medium having computer program logic recorded thereon for program code for interactive level set image segmentation, by: selecting and labeling by user input respective image areas of object and of background; initializing an embedding function φ for implementing a segmenting boundary in accordance with the user input; computing intensity distributions $p_1$ and $p_2$ by performing a kernel density estimate of intensity distributions associated with the respective areas of object and of background; and performing repeatedly steps (a), (b), (c) and (d) below until convergence is reached: (a) evolving the embedding function φ in accordance with an evolution equation, (b) recomputing the distributions p1 and p2, and (c) if a new user input is found, updating labeling of the areas of object and background and returning to step (a) and, if no new user input is found, then ending.

BRIEF DESCRIPTION OF THE SEVERAL VIEWS OF THE DRAWING

The invention will be more fully understood from the detailed description following, in conjunction with the Drawing, in which.

DETAILED DESCRIPTION OF THE INVENTION

Figure 1:
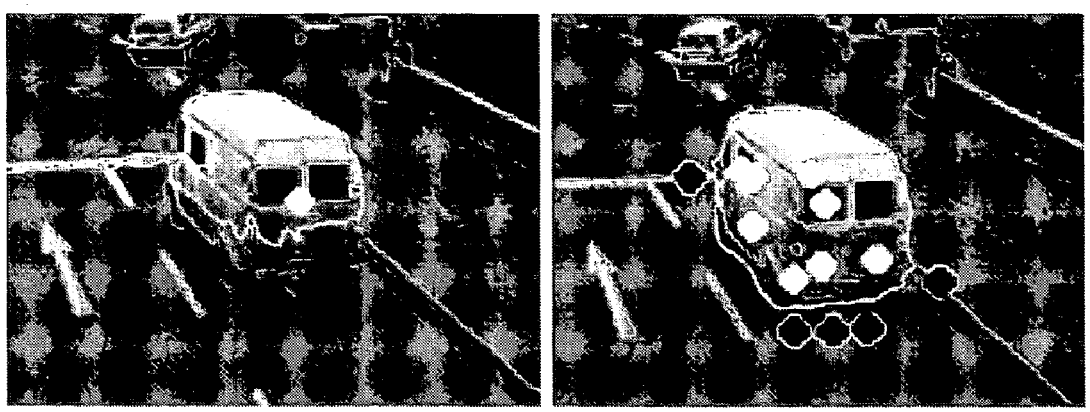
FIG. 1 shows segmentation of a traffic image helpful to illustrating aspects of segmentation in accordance with the principles of the present invention.

An overview of the operation of the present invention is first given, as follows. A probabilistic formulation of level set segmentation is developed which allows the system to integrate a user input on equal footings with the input intensity image. Both are treated as independent observations of an underlying scene. The segmentation process computes the most probable segmentation given the intensity image and given a labeling specifying points which a user marked as 'object' or as 'background'. The formulation is based on the premise that user input and intensity information are independent, the effect of the user input is characterized by two parameters which model the spatial uncertainty, which may be viewed as corresponding to a "brush size", and the overall reliability of the user labeling.

A narrow band implementation on graphics hardware provides the necessary speed for a smooth interaction and direct feedback from the segmentation process. As a consequence, the user can easily influence the segmentation process during the boundary evolution as well as correct the final segmentation.

In the following, a probabilistic formulation of user interaction in the context of image segmentation in accordance with principles of the present invention will next be described. An important aspect recognized in the present invention is to treat the user input as an independent measurement or observation of the true underlying scene. In this sense, the user input is treated on an equal footing with the intensity input. The segmentation process subsequently computes the most likely segmentation given the image input and given the user input. In contrast to a rule-based reasoning, this approach allows for inaccuracies in the user input: if a location is marked as 'object' by the user then areas in its vicinity are associated with a certain probability of being part of the object. The respective variational principle thus incorporates the user input as a soft constraint rather than a hard constraint. It is merely another source of information beyond the one given by the input image. In the resulting segmentation process, the evolving boundary is driven by a competition of the image intensity information and the user input.

This formulation allows the use of a narrow band level set scheme. Furthermore, an implementation of the algorithm in accordance with the present invention on a standard graphics card allows for a runtime which is sufficient to provide for a smooth interaction of the human expert. An immediate response enables the user to guide the segmentation process interactively.

It should be pointed out that while interactive level set methods and fast implementations using Graphics Hardware have been disclosed by, for example, Lefohn et al., nevertheless, the notion of interaction in the prior work is restricted to allowing the user to initialize the level set evolution, and to modify the intensity model. See A. E. Lefohn, J. M. Kniss, C. D. Hansen, and R. T. Whitaker: Interactive deformation and visualization of level set surfaces using graphics hardware: IEEE Trans. on Visualization and Computer Graphics, pages 75-82, 2003.

In fact, in the prior work, the user input does not directly enter the level set evolution; it is merely used to estimate the parameters of a simple intensity model. This type of interaction will not suffice for objects with complex intensity distributions or with intensity levels similar to that of the background. An important aspect of the present invention is to develop a statistical framework for a user interaction which does not merely provide an initialization for the algorithm, but which actually gives an indication, beyond the intensity information contained in the input image, as to which areas are likely to be part of the object or the background. As a consequence, the evolving boundaries are directly driven by both the intensity information and by the user labeling.

Image segmentation can be formulated as a problem of Bayesian inference; see for example J. Besag: On the statistical analysis of dirty pictures: J. Roy. Statist. Soc., Ser. B., 48(3):259-302, 1986; and S. C. Zhu and A. Yuille: Region competition: Unifying snakes, region growing, and Bayes/MDL for multiband image segmentation: IEEE T. on Patt. Anal. and Mach. Intell., 18(9):884-900, 1996.

In the context of level set segmentation, the goal of segmentation is to compute the most likely embedding function $\phi$ given an input image $I:\Omega \to R$ by maximizing the conditional probability $$P(\phi|I) \propto P(I|\phi)P(\phi). \quad (2)$$

The first term in the product allows the introduction of an appropriate image formation model, stating which intensity observations are likely given a particular object-background configuration. The second term allows one to impose a prior on the embedding function stating which segmentations are a priori more or less likely. Beyond generic smoothness priors (favoring a short boundary of the segmentation), it has become popular to impose higher-level statistical priors which allow one to constrain the shape of the segmentation to a distribution of familiar shapes.

Let it be assumed that an input is given from a user who marked certain image locations as "object" or as "background". How should such additional information be incorporated in the above probabilistic formulation? Clearly one cannot treat this additional information as a prior in order to constrain the segmentation process according to the user specifications. This user input is not an a priori information because it is clearly dependent on the current segmentation task. Rather, in the context of the present invention, it should, in general, be treated as another observation beyond the input intensity image. This will be detailed in the following exemplary embodiment for the segmentation of a single object of interest in the image plane $\Omega$. The object of interest may be multiply connected and the segmentation shall be defined in terms of a level set function $\phi: \Omega \to R$, where image locations x with $\phi(x) \geq 0$ denote parts of the object and locations x with $\phi(x) \leq 0$ denote the background.

Let it be assumed, for example, that we are given an image $I:\Omega \to R$ and a user input $$L:\Omega \to \{-1, 0, 1\}, \quad (3)$$

where the label values reflect the user input, namely:

$$L(x) = \begin{cases} +1, & x \text{ marked as 'object'}, \\ -1, & x \text{ marked as 'background'}, \\ 0, & x \text{ not marked.} \end{cases} \quad (4)$$

The segmentation by an embedding function is computed by maximizing the a posteriori probability $$P(\phi|I, L) = \frac{P(I, L|\phi)P(\phi)}{P(I, L)} \quad (5)$$

with respect to the embedding function $\phi$. For the partitioning of the image, merely the sign of the function is of interest. To impose a unique correspondence between segmentation and embedding function, we additionally constrain $\phi$ to the space of signed distance functions, i.e. the magnitude of $\phi$ is given by the distance of the respective point to the boundary. We enforce this constraint with the help of a partial differential equation as detailed in M. Sussman, S. P., and S. J. Osher: A level set approach for computing solutions to incompressible two phase flow. J. of Comp. Phys., 94:146-159, 1994.

In the following, we will expand the Bayesian approach (5) by making various assumptions regarding the relations of intensity information, label information and segmentation. Note that the denominator in (5) does not depend on the segmentation; it can therefore be neglected in the optimization. Firstly, we will assume that the input image and the user-specified labeling are independent, i.e.

$$P(I, L|\phi) = P(I|\phi)P(L|\phi). \quad (6)$$

This assumption may not be very accurate since the user input is often based on the intensity image. We nevertheless make this assumption in order to derive a computationally simple solution to the problem.

A key challenge is now to model the likelihood $P(L|\phi)$ for a user label configuration L given a segmentation $\phi$. More precisely, this expression can be written as:

$$P(L|\phi) = \prod_{x \in \Omega} \prod_{y \in \Omega} [P(L(x), x | \phi(y), y)]^{dxdy}, \quad (7)$$

where we have assumed that the label values at different locations are mutually independent (leading to a product over all x), and that the values of $\phi$ at different locations are mutually independent, leading to a product over all y. The exponent dx dy gives the volume of the bin and guarantees the appropriate continuum limit.

The following includes considerations of non-local interaction.

Each individual term $P(L(x),x|\phi(y),y)$ models the likelihood of a label value $L(x)$ at location x given the segmentation location y. This will be modeled as:

$$P(L(x), x \mid \phi(y), y) \propto \exp\left(\frac{v_2}{2}L(x)\ \text{sign}\ (\phi(y))k_\sigma(x, y)\right), \quad (8)$$

The reasoning behind this choice for the likelihood is the following: if the level set function at a location y is positive, i.e. $\text{sin}(\phi(y))=1$, then a point x in its vicinity is more likely to be marked object ($L(x)=1$) and less likely to be marked background ($L(x)=-1$), and vice versa for background points. The Gaussian kernel function $$k_\sigma(x, y) = \frac{1}{2\pi\sigma^2}\exp\left(-\frac{(x-y)^2}{2\sigma^2}\right)$$

ensures that this coupling decays with the distance between x and y. Our model for the user interaction has two free parameters $v_2$ and $\sigma$ which can be interpreted as follows. The parameter $v_2$ provides the overall weight of the user interaction and will determine how strongly the user input will affect the segmentation. The parameter $\sigma$ defines the spatial range within which a point labeled as object or as background will affect the segmentation. It can therefore be interpreted as a 'brush size'.

In a practical application, it is very likely that a user will click the same point multiple times. As with other modeling choices in the present description, the focus here, in the interest of clarity, is on one of the simplest ways to integrate this effectively in the probabilistic formulation. The assumption is made that all these clicks are independent, as if given by several independent users. This leads to several label functions $\{L_1, \ldots, L_n\}$. Since these are treated as independent, this amounts to setting a single label function to $$L=(\text{\# of positive clicks})-(\text{\# of negative clicks}). \quad (9)$$

Various other equivalent ways of integrating multiple clicks are contemplated. For example, one can drop the independency assumption, stating that if a user clicks a certain point again then this implies that the user is really sure about the selection, such that the effect of a click will be stronger depending on whether it was clicked before. This would lead to a nonlinear dependency of L on the number of clicks.

With regard to the intensity model, the image term in (6) is expanded in a similar fashion:

$$\mathcal{P}(I \mid \phi) = \prod_{x \in \Omega}[\mathcal{P}(I(x) \mid \phi(x))]^{dx}. \quad (10)$$

As above, it is assumed that intensities at different locations are mutually independent, but in contrast to (7), it is additionally assumed that the intensity at a location x merely depends on the value of the level set function at that same location. As a specific intensity model, it is assumed that object and background intensities are independent samples from two distributions p1 and p2:

$$\mathcal{P}(I(x) \mid \phi(x)) = \begin{cases} p_1(I), & \text{if } \phi(x) \geq 0 \\ p_2(I), & \text{if } \phi(x) < 0 \end{cases} \quad (11)$$

The two distributions can be inferred from the respective regions by fitting parametric distributions, see M. Rousson and R. Deriche: A variational framework for active and adaptative segmentation of vector valued images: In Proc. IEEE Workshop on Motion and Video Computing, pages 56-62, Orlando, Fla., December 2002, or more generally by performing a Parzen-Rosenblatt kernel density estimate. Reference is made to the following for details: J. Kim, J. Fisher, A. Yezzi, M. Cetin, and A. Willsky: Nonparametric methods for image segmentation using information theory and curve evolution: In IEEE International Conference on Image Processing, pages 797-800, September 2002.

As a prior on the embedding function $\phi$ in expression (5), a constraint is merely added on the length of its zero crossing:

$$P(\phi)=\exp(-v_1 \cdot |\nabla H(\phi)|dx), \quad (12)$$

where H denotes the Heaviside step function. Similar boundary length constraints are common in variational segmentation methods, such as the Snakes or the Mumford-Shah functional. See M. Kass, A. Witkin, and D. Terzopoulos: Snakes: Active contour models: Int. J. of Computer Vision, 1(4):321-331, 1988; and the above-cited publication by Mumford and J. Shah.

This particular level set formulation is due to Chan and Vese; see the above-cited publication by T. Chan and L. Vese. Given prior shape knowledge about the objects of interest, more sophisticated constraints can be imposed. See. for example, the above cited publications by Leventon et al.; A. Tsai, A. J. Yezzi, and A. S. Willsky; Y. Chen et al.; and D. Cremers, S. J. Osher, and S. Soatto.

With regard to the variational formulation, maximizing the a posteriori distribution (5) is equivalent to minimizing its negative logarithm. Up to a constant, the latter is given by an energy of the form:

$$E(\phi)=E_{image}(\phi)+v_2 E_{user}(\phi)+v_1 E_{shape}(\phi), \quad (13)$$

where the data term is given by the negative logarithm of (10):

$$E_{data}(\phi) = -\int \log p_1(I(x))H(\phi(x))dx - \int \log p_2(I(x))(1-H(\phi(x)))dx. \quad (14)$$

The energy associated with the user input is given by:

$$E_{user}(\phi) = -\frac{1}{2}\int\int L(x)\ \text{sign}\ (\phi(y))k_\sigma(x, y)dxdy \quad (15)$$
$$= -\frac{1}{2}\int L_\sigma(y)\text{sign}\ (\phi(y))dy,$$

with the Gaussian-smoothed label function $$L_\sigma(y)=\int L(x)k_\sigma(x,y)dx.$$

The geometric prior (12) amounts to the length constraint $$E_{shape}(\phi)=\int|\nabla H(\phi)|dx$$

Expressing the sign function as sign $(\phi)$ $2H(\phi)-1$, we can combine the three energies to obtain the total energy:

$$E(\phi) = -\int \log p_1(I) H(\phi) dx - \qquad (16)$$

$$\int \log p_2(I)(1 - H(\phi)) dx + \int L_\sigma H(\phi) + |\nabla H(\phi)| dx,$$

Minimization of this energy can be done by evolving the following descent equation:

$$\frac{\partial \phi}{\partial t} = \delta(\phi) \left( v_1 div\left(\frac{\nabla \phi}{|\nabla \phi|}\right) + (e_2 - e_1) + v_2 L_\sigma \right), \qquad (17)$$

where the energy densities $e_i = -\log p_i$ were introduced. The three terms in the above evolution equation can be interpreted as follows: the first term aims at minimizing the length of the segmenting boundary; the second term drives the boundary to separate the two intensity distributions; and the last term imposes the user input, driving the segmentation process to favor the segmentation of object and background as indicated by the user.

The implementation of the above interactive level set segmentation method will next be discussed, with consideration of efficient implementation via narrow band methods and hardware speedup. A key aspect is to provide for a fast implementation such that the user interaction can be introduced in real-time during the segmentation process, i.e. the segmentation will adapt to the user input without delay. It is believed that such direct feedback is important for increasing the practical usefulness of the present invention.

The two components allowing for fast implementation will be detailed in the following. Due to the Delta function multiplying the entire expression (17), one need only update $\phi$ values in the vicinity of the zero crossing. This is a central idea of the so-called narrow band methods. See D. Adalsteinsson and J. Sethian: A Fast Level Set Method for Propagating Interfaces Journal of Computational Physics, 118(2):269-277, 1995.

In the case of the present embodiment of the invention, it guarantees that the runtime complexity of the method of the present invention remains linear in the number of boundary pixels. This advantage of the method of the present invention will give rise to fast computation times, in particular when segmenting 3D volumes. Furthermore, a key computational challenge is a fairly simple update of the level set values over many iterations.

With regard also to practical considerations in the implementation of an embodiment of the present invention, it is noted that for such large-scale iterative methods, the implementation of respective algorithms on the graphics processing unit (GPU) has generally become increasingly popular, not only because GPUs are becoming more powerful (allowing floating point rather than previous integer computations), but also because at the current rate of improvement, their speed typically tends to double every six month. See J. D. Owens, D. Luebke, N. Govindaraju, M. Harris, J. Krueger, A. E. Lefohn, and T. J. Purcell: A survey of general-purpose computation on graphics hardware. In Eurographics2005, State of the Art Reports, pages 21-51, Aug. 2005.

To guarantee maximal speed of implementation in accordance with the present invention without sacrificing computational accuracy, an implementation on a standard GPU was utilized for the present embodiment. The GPU is typically designed for and driven by video game development; and its programming environment is tightly constrained. Therefore, porting a CPU code to the GPU involves some major challenges. For example, the GPU does not allow a fragment processor to write at any arbitrary memory location; and for optimal speed one needs to minimize the communication between CPU and GPU.

In practice, the segmentation of an image or volume of interest in accordance with the present invention is obtained typically in the following manner:
 the user selects areas of object and of background, generally using the mouse and some fixed brush size $\sigma$;
 the embedding function $\phi$ implementing the boundary is initialized according to this user input;
 compute the distributions $p_1$ and $p_2$ by performing a kernel density estimate of the intensity distributions associated with the inside or object region and the outside or background region; and
 repeatedly performing the following steps until convergence is reached, that is, where no further movement of the boundary occurs:
  (a) evolve the embedding function $\phi$ according to equation (17), using a fast narrow-band formulation implemented on a graphics card,
  (b) recompute the distributions p1 and p2, and
  (c) check for new user input from the mouse and, if so, update the labeling $L_o(x)$.

Experimental work with an embodiment of the present invention will next be described and illustrated.

As soon as the image term driving the curve evolution (17) does not describe precisely enough the object of interest, letting the user interact becomes vital. In the following, we present several problematic real cases which can be corrected easily with placing only a few background and foreground seeds. For the initialization, the user is asked to place at least one foreground seed corresponding to the inside part of the initial level set.

FIG. 1 shows an example of segmentation obtained in a traffic scene. The van can be accurately segmented with some interaction even if its histogram does not give enough information to discriminate it from the background. Thus, the user is able to extract an object whose intensity model is not well discriminative with respect to the background. Foreground and background seeds are respectively shown in white and black. The image size is 344×282 and the segmentation time is 0.3 seconds.

In the second set of experiments, different medical image modalities are considered.

Figure 2:
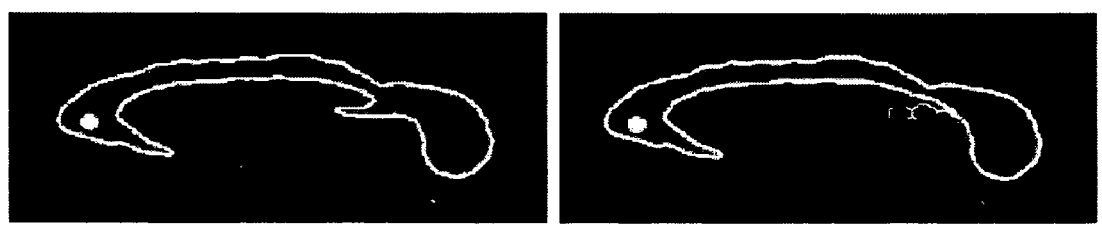
FIG. 2 shows segmentation of a head MRI image helpful to illustrating aspects of segmentation in accordance with the principles of the present invention.

FIG. 2 shows an example of segmentation in a 2D MR image of a head, where the Corpus Callosum was extracted accurately with very little effort, only a few seeds being required. A single click gives a segmentation of the Corpus Callosum including a part of the Formix (the small spike on the bottom) which is removed with three background seeds The image size is 512×512 and the segmentation time is 0.9 seconds.

The algorithm has also been tested on a 2D UltraSound image of the heart (the Four Chamber view).

Figure 3:
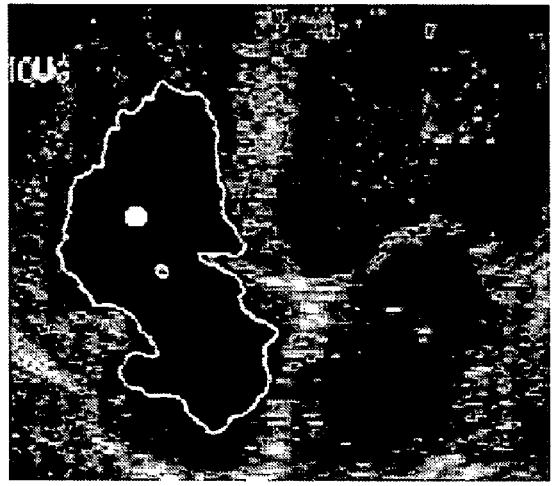
FIG. 3 shows segmentation of a four chamber heart ultrasound image helpful to illustrating aspects of segmentation in accordance with the principles of the present invention.
Figure 3:
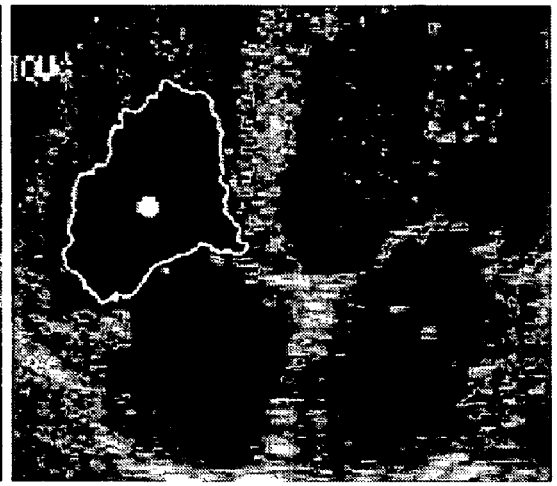
Figure 3:
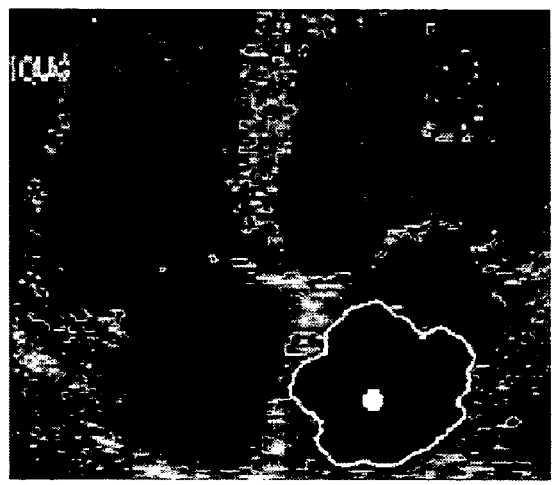
Figure 3:
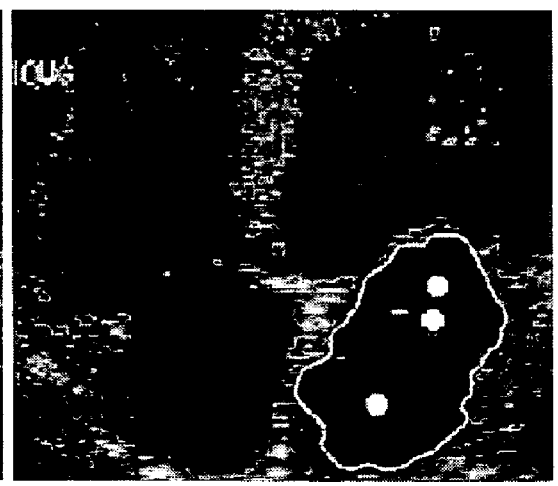

The interactive segmentation of two chambers is presented in FIG. 3, which shows a four chamber UltraSound image. The other two chambers have also been segmented very easily. This is an example of interactive segmentations of two chambers with 4 and 3 mouse clicks. The image size is 320× 240 and the segmentation time is 0.2 seconds.

The last medical experiment considers a 3D CT image of the heart. The straightforward extension to 3D or to higher dimensions is an important advantageous property of the level set formulation.

Figure 4:
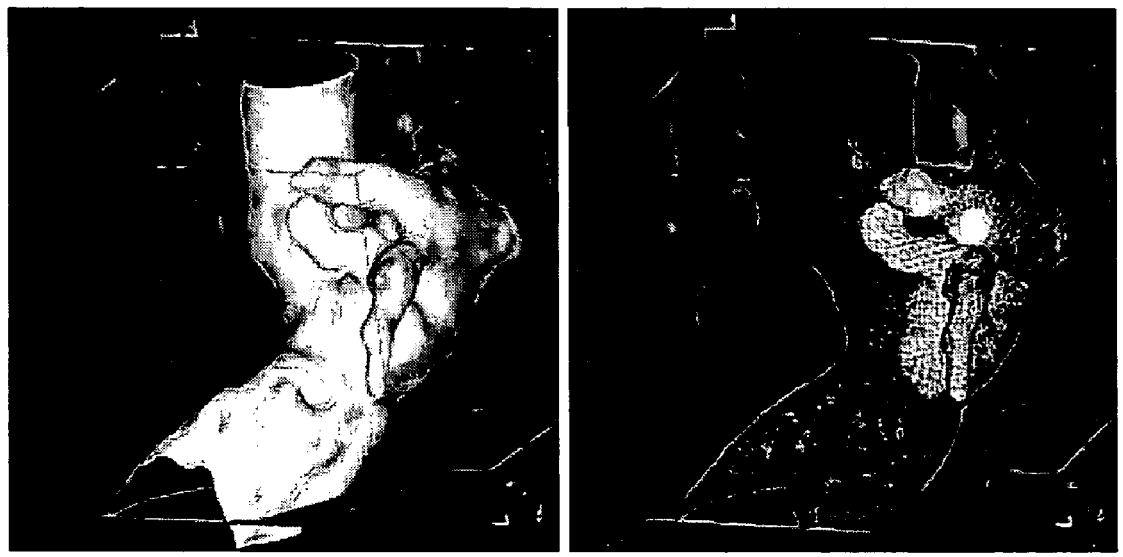
FIG. 4 shows a 3-dimensional (3D) heart CT image, including the placement of seeds, and helpful to illustrating aspects of segmentation in accordance with the principles of the present invention.

FIG. 4 shows a 3D Heart CT, illustrating the interactive formulation in accordance with principles of the present invention to isolate the Left Atrium from other structures of the heart with similar intensity properties in CT images. One seed placed in the aorta gives a final segmentation including the left atrium, the left ventricle and the aorta (on the left). Most often these three structures need to be separated. This can be done by placing several background seeds between them. For example, the left atrium (on the right) was obtained by setting background seeds in only three slices. The image size is 64×64×64 and the segmentation time is 11 seconds. For all experiments: $v_1=1$ and $v_2=10$.

Figure 5:
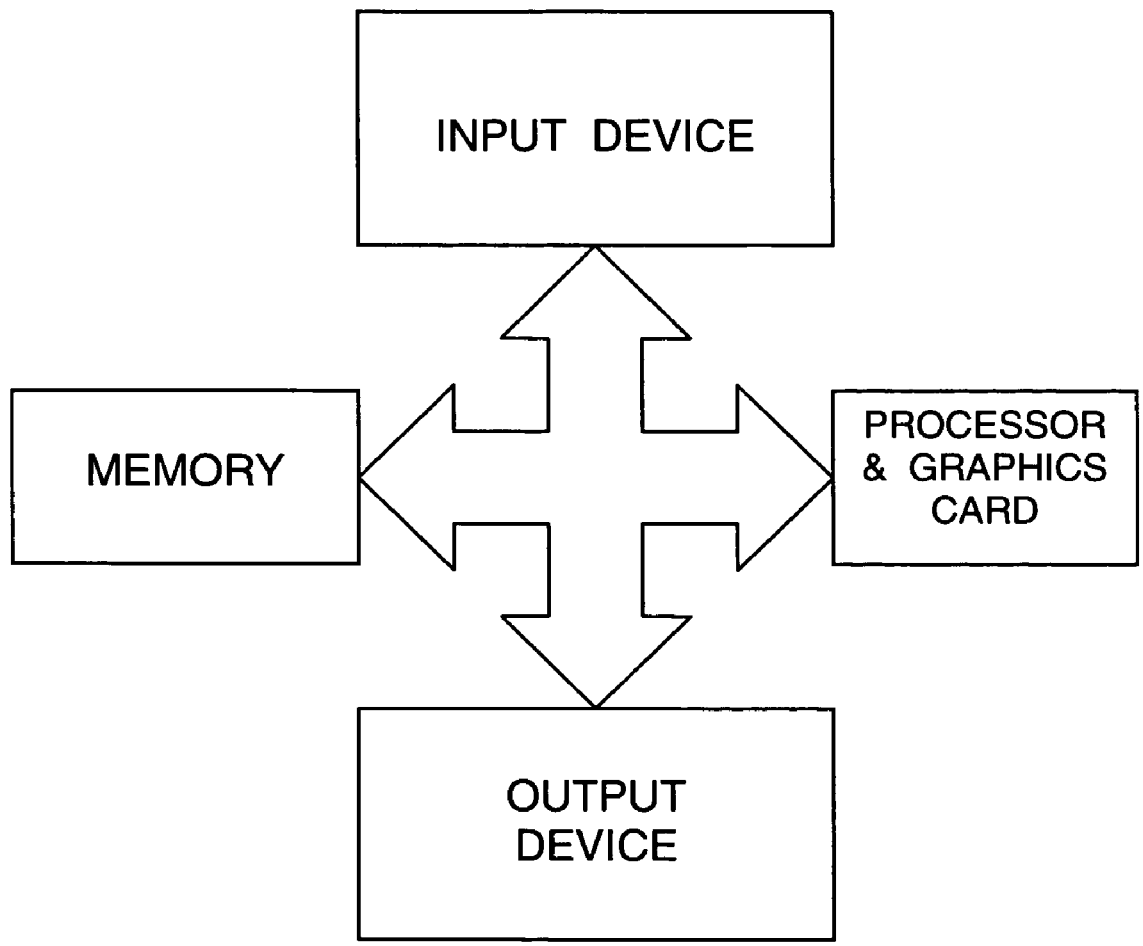
FIG. 5 shows in basic schematic form a digital processor coupled for two way data communication with an input device, an output device, a graphics card and a memory device for storing a program and other data as may be typically used in an embodiment of the present invention.

As will be apparent, the present invention is best intended to be implemented with the use and application of imaging equipment in conjunction with a programmed digital computer. FIG. 5 shows in basic schematic form a digital processor coupled for two way data communication with an input device, an output device, a graphics card, and a memory device for storing a program and other data. The input device is so designated in broad terms as a device for providing an appropriate image or images for processing in accordance with the present invention. For example, the input may be from an imaging device, such as a device incorporated in a CATSCAN, X-ray machine, an MRI or other device, or a stored image, or by communication with another computer or device by way of direct connection, a modulated infrared beam, radio, land line, facsimile, or satellite as, for example, by way of the World Wide Web or Internet, or any other appropriate source of such data. The output device may include a computer type display device using any suitable apparatus such as a cathode-ray kinescope tube, a plasma display, liquid crystal display, and so forth, or it may or may not include a device for rendering an image and may include a memory device or part of the memory device of FIG. 5 for storing an image for further processing, or for viewing, or evaluation, as may be convenient, or it may utilize a connection or coupling including such as are noted above in relation to the input device. The processor is operative with a program set up in accordance with the present invention for implementing steps of the invention. Such a programmed computer may interface readily through communications media such as land line, radio, the Internet, and so forth for image data acquisition and transmission.

Images may be inputted directly, or by way of storage, or communication with another computer or device by way of direct connection, a modulated infrared beam, radio, land line, facsimile, or satellite as, for example, by way of the World Wide Web or Internet, or any other appropriate source of such data. The image output device may include a computer type display device using any suitable apparatus such as a cathode-ray kinescope tube, a plasma display, liquid crystal display, and so forth, or it may include memory for storing an image for further processing, or for viewing, or evaluation, as may be convenient, or it may utilize a connection or coupling including such as are noted above in relation to the input. The processor is operative with a program set up in accordance with the present invention for implementing steps of the invention. Such a programmed computer may interface readily through communications media such as land line, radio, the Internet, and so forth for image data acquisition and transmission.

The invention may be readily implemented, at least in part, in a software memory device and packaged in that form as a software product. This can be in the form of a computer program product comprising a computer useable medium having computer program logic recorded thereon for program code for performing the method of the present invention.

The present invention has also been explained in part by way of examples using illustrative exemplary embodiments. It will be understood that the description by way of exemplary embodiments is not intended to be limiting and that, while the present invention is broadly applicable, it is helpful to also illustrate its principles, without loss of generality, by way of exemplary embodiments.

It will also be understood that various changes and substitutions not necessarily herein explicitly described may be made by one of skill in the art to which it pertains. Such changes and substitutions may be made without departing from the spirit and scope of the invention which is defined by the claims following.

What is claimed is:

1. A method for interactive level set image segmentation of an input image, comprising:
   utilizing a programmable digital computer for:
   selecting and labeling by user input respective image areas of object and of background of said input image;
   initializing an embedding function $\phi$ for implementing a segmenting boundary in accordance with said user input;
   computing intensity distributions $p_1$ and $p_2$ by performing a kernel density estimate of intensity distributions associated with said respective image areas of object and of background; and
   performing repeatedly steps (a), (b), (c) and (d) below until convergence is reached:
   (a) evolving said embedding function $\phi$ in accordance with an evolution equation,
   (b) recomputing said distributions p1 and p2, and
   (c) if a new user input is found, updating labeling of said image areas of object and background and returning to said step of initializing and, if no new user input is found, then
   (d) if convergence is reached, ending with an image exhibiting segmentation, and if not, then returning to step (a).

2. A method for image segmentation as recited in claim 1, wherein:
   said step of evolving comprises utilizing a narrow band formulation.

3. A method for image segmentation as recited in claim 2, comprising:
   implementing said narrow band formulation on a graphics card.

4. A method for image segmentation as recited in claim 3, wherein:
   said step of evolving comprises evolving for minimizing the total energy associated with each of data, user input, and shape.

5. A method for image segmentation as recited in claim 3, wherein:
   said step of evolving comprises evolving the following descent equation:

$$\frac{\partial \phi}{\partial t} = \delta(\phi)\left(v_1 div\left(\frac{\nabla \phi}{|\nabla \phi|}\right) + (e_2 - e_1) + v_2 L_\sigma\right);$$

wherein
   $v_1$ and $v_2$ are parameters for providing an overall weight of said user input to determine how strongly said user input will affect segmentation,
   $e_i = -\log p_i$ represents an energy density, $L_o$ is a Gaussian smoothed label function given by $L_o(y) = \int L(x)k_\sigma(x,y)dx$, where "brush size" $\sigma$ defines a spatial range within which a point labeled as object or as background will affect segmentation, and $k_\sigma$ is the Gaussian kernel function.

6. A method for image segmentation as recited in claim 1, wherein, in the event of multiple selections of a given area by said user input,
   treating such selections as independent events for providing a single label function corresponding to the number of positive selections minus the number of negative selections.

7. A method for image segmentation as recited in claim 1, wherein, in the event of multiple selections of a given area by said user input,
   treating repeated selections of the same sign as strengthening the effect of such selections.

8. A method for interactive level set image segmentation of an input image, comprising:
   utilizing a programmable digital computer for:
   selecting and labeling by user input respective image areas of object and of background of said input image;
   initializing an embedding function $\phi$ for implementing a segmenting boundary in accordance with said user input;
   computing intensity distributions $p_1$ and $p_2$ by performing a kernel density estimate of intensity distributions associated with said respective image areas of object and of background;
   evolving said embedding function $\phi$ in accordance with an evolution equation;
   recomputing said distributions $p_1$ and $p_2$;
   following any new user input, updating said labeling and continuing from said step of initializing, and otherwise, if no new user input has occurred, and
   if convergence is not reached, returning to step of evolving until convergence is reached for ending with an image exhibiting segmentation.

9. A method for image segmentation of an input image interactively with a user, comprising:
   utilizing a programmable digital computer for:
   utilizing a level set method for segmentation, including an embedding function $\phi$;
   selecting and labeling by user input respective image areas of object and of background;
   initializing said embedding function $\phi$ implementing a segmenting boundary according to said selecting;
   computing intensity distributions $p_1$ and $p_2$ by performing a kernel density estimate of intensity distributions associated with said respective image areas of object and of background; and
   performing repeatedly steps (a), (b), (c) and (d) below until convergence is reached:
   (a) evolving said embedding function $\phi$ as a function of said distributions $p_1$ and $p_2$, a Gaussian smoothed label function, and an overall weight accorded said user input,
   (b) recomputing said distributions p1 and p2, and
   (c) checking for new user input and, if so:
   (d) updating labeling of said areas of object and background and continuing from said step of initializing and if no new user input has occurred, then
   if convergence is not reached, returning to said step of evolving until convergence is reached for ending with an image exhibiting segmentation.

10. A method for image segmentation as recited in claim 9, comprising:
   implementing foregoing steps on a graphics card.

11. A method for image segmentation as recited in claim 9, comprising:
   implementing foregoing steps on a graphics card in a narrow band formulation.

12. A method for image segmentation as recited in claim 9, comprising:
   defining convergence as a point when changes cease in said boundary.

13. A method for image segmentation as recited in claim 9, wherein:
   said step of evolving said embedding function $\phi$ comprises evolving a descent equation wherein:
   a first term operates to minimize the length of said boundary,
   a second term drives said boundary to separate said intensity distributions, and
   a third term controls said segmentation such that said segmentation tends to favor segmentation of said areas of object and background in compliance with said user input.

14. A method for image segmentation as recited in claim 9, comprising:
   utilizing a narrow band formulation; and
   updating values of said embedding function $\phi$ only in the vicinity of a zero crossing by utilizing a narrow band formulation.

15. A method for image segmentation as recited in claim 9, comprising:
   utilizing computational speed in conjunction with said narrow band formulation such that said segmentation will adapt to said user input without substantial delay.

16. A method for image segmentation as recited in claim 15, comprising:
   implementing foregoing steps on a graphics card.

17. A method for image segmentation as recited in claim 9, comprising:
   making the probability of a given area being labeled as one of object and background exhibit a dependent degree of coupling on labeling of adjacent areas, such that if an area in the vicinity of said given area is labeled object, then the given area is more likely to be labeled object, and mutatis mutandis for background areas.

18. A method for image segmentation as recited in claim 17 wherein said step of
   making the probability of a given area being labeled as one of object and background exhibit a dependent degree of coupling comprises:
   controlling said degree of coupling to decay with increasing separation distance between said given area and said area in said vicinity.

19. A method for image segmentation as recited in claim 9, wherein:
   said user input comprises using a fixed "brush size" $\sigma$.

20. A method for image segmentation as recited in claim 19, wherein:
   said brush size $\sigma$ defines a spatial range within which a point labeled as object or as background will affect segmentation.

21. A method for image segmentation as recited in claim 9, comprising:
   setting a parameter v for providing an overall weight of said user input to determine how strongly said user input will affect segmentation.

22. A method for image segmentation as recited in claim 9, wherein:
said user input comprises using a computer mouse.

23. A method for image segmentation as recited in claim 9, wherein
said step of computing intensity distributions $p_1$ and $p_2$ comprises:
inferring said intensity distributions from respective corresponding ones of said regions by fitting parametric distributions.

24. A method for image segmentation as recited in claim 9, wherein
said computing intensity distributions $p_1$ and $p_2$ comprises:
inferring said intensity distributions from respective corresponding ones of said regions by performing a Parzen-Rosenblatt kernel density estimate.

25. A method for image segmentation as recited in claim 9, comprising:
imposing a unique correspondence between segmentation and said embedding function $\phi$ by additionally constraining $\phi$ to a space of signed distance functions such that a magnitude of $\phi$ is given by distance of the respective point to the boundary.

26. A method for image segmentation of an input image interactively with a user, comprising:
utilizing a programmable digital computer for:
utilizing a level set method for segmentation, including an embedding function $\phi$;
selecting and labeling by user input respective image areas of object and of background;
initializing said embedding function $\phi$ implementing a segmentation boundary according to said selecting;
computing intensity distributions $p_1$ and $p_2$ for said respective areas of object and of background by one of:
(A) inferring said intensity distributions from respective corresponding ones of said regions by fitting parametric distributions, and
(B) inferring said intensity distributions from respective corresponding ones of said regions by performing a Parzen-Rosenblatt kernel density estimate;
evolving said embedding function $\phi$ by evolving a descent equation:

$$\frac{\partial \phi}{\partial t} = \delta(\phi)\left(v_1 div\left(\frac{\nabla \phi}{|\nabla \phi|}\right) + (e_2 - e_1) + v_2 L_\sigma\right);$$

wherein
$v_1$ and $v_2$ are parameters for providing an overall weight of said user input to determine how strongly said user input will affect segmentation,
$e_i = -\log p_i$ represents an energy density,
$L_o$ is a Gaussian smoothed label function given by $L_o(y) = \int L(x)k_o(x, y)dx$, where "brush size" $\sigma$ a defines a spatial range within which a point labeled as object or as background will affect segmentation, and
$k_o$ is the Gaussian kernel function;
recomputing said distributions p1 and p2, and
checking for new user input and, if so:
updating labeling of said areas of object and background and continuing from said step of initializing; and if not, then
checking whether convergence has been reached, and if it has not, then returning to said step of evolving said embedding function $\phi$, and
if it has, then ending with an image exhibiting segmentation.

27. A method for image segmentation as recited in claim 26, comprising:
updating values of said embedding function $\phi$ only in the vicinity of a zero crossing by utilizing a narrow band formulation.

28. A method for image segmentation as recited in claim 27, comprising:
implementing foregoing steps on a graphics card.

29. A method for image segmentation as recited in claim 27, comprising:
implementing foregoing steps on a graphics card using said narrow band formulation.

30. A method for image segmentation of an input image interactively with a user, comprising:
utilizing a programmable digital computer for:
labeling by user input respective image areas of object and of background;
initializing an embedding function $\phi$ implementing a segmentation boundary according to said labeling;
computing intensity distributions $p_1$ and $p_2$ for said respective areas of object and of background; and
performing repeatedly steps (a), (b), (c) and (d) below until convergence is reached:
(a) evolving said embedding function $\phi$ using a fast narrow-band formulation implemented on a graphics card, as a function of: said distributions $p_1$ and $p_2$, a Gaussian smoothed label function, and an overall weight accorded said user input,
(b) recomputing said distributions p1 and p2,
(c) checking for new user input and, if so,
(d) updating labeling of said areas of object and background and continuing from said step of initializating; and
checking whether convergence has been reached and if convergence is not reached, returning to step (a) until convergence is reached for ending with an image exhibiting segmentation.

31. A method for image segmentation of an input image interactively with a user, comprising:
labeling by user input respective image areas of object and of background;
initializing an embedding function $\phi$ implementing a segmenting boundary according to said labeling;
computing intensity distributions $p_1$ and $p_2$ for said respective areas of object and of background; and
performing repeatedly steps (a), (b), (c) and (d) below until convergence is reached:
(a) evolving said embedding function $\phi$ as a function of: said distributions $p_1$ and $p_2$, a Gaussian smoothed label function, and an overall weight accorded said user input, by minimizing a total energy being the sum of:
(A) energy associated with the length of said segmenting boundary,
(B) energy associated with said segmenting boundary in separating said respective areas, and
(C) energy associated with said user input;
(b) recomputing said distributions p1 and p2, and
(c) checking for new user input and, if so,
(d) updating labeling of said areas of object and background and continuing from said step of initializing; and if not, then
checking whether convergence is reached for ending with an image exhibiting segmentation.

32. A system for imaging for interactive level set image segmentation, comprising:

memory means for storing a program and other data; and processor means in communication with said memory device, said processor being operative with said program to perform:

selecting and labeling by user input respective image areas of object and of background;

initializing an embedding function $\phi$ for implementing a segmenting boundary in accordance with said user input;

computing intensity distributions $p_1$ and $p_2$ by performing a kernel density estimate of intensity distributions associated with said respective areas of object and of background; and performing repeatedly steps (a), (b), (c) and (d) below until convergence is reached:
 (a) evolving said embedding function $\phi$ in accordance with an evolution equation,
 (b) recomputing said distributions p1 and p2, and
 (c) if a new user input is found, updating labeling of said areas of object and background and returning to said step of initializing and, if no new user input is found and convergence has occurred, then ending.

33. A system for image segmentation as recited in claim 32, wherein:

said step of evolving comprises utilizing a narrow band formulation.

34. A system for image segmentation as recited in claim 33, comprising:

implementing said narrow band formulation on a graphics card.

35. A computer program product comprising a computer useable medium having computer program logic recorded thereon for program code for interactive level set image segmentation, by:

programming a computer for:

selecting and labeling by user input respective image areas of object and of background;

initializing an embedding function $\phi$ for implementing a segmenting boundary in accordance with said user input;

computing intensity distributions $p_1$ and $p_2$ by performing a kernel density estimate of intensity distributions associated with said respective areas of object and of background; and performing repeatedly steps (a), (b), (c) and (d) below until convergence is reached:
 (a) evolving said embedding function $\phi$ in accordance with an evolution equation,
 (b) recomputing said distributions p1 and p2, and
 (c) if a new user input is found, updating labeling of said areas of object and background and returning to said step of initializing and, if no new user input is found, then
 (d) if convergence is reached, ending with an image exhibiting segmentation, otherwise returning to step (a).

36. A computer program product for image segmentation as recited in claim 35, wherein:

said step of evolving comprises utilizing a narrow band formulation.

37. A computer program product for image segmentation as recited in claim 36, comprising:

implementing said narrow band formulation on a graphics card.

\* \* \* \* \*